(12) United States Patent
Kwant et al.

(10) Patent No.: US 10,776,951 B2
(45) Date of Patent: Sep. 15, 2020

(54) METHOD, APPARATUS, AND SYSTEM FOR AN ASYMMETRIC EVALUATION OF POLYGON SIMILARITY

(71) Applicant: HERE GLOBAL B.V., Eindhoven (NL)

(72) Inventors: Richard Kwant, Oakland, CA (US); Anish Mittal, Berkeley, CA (US); David Lawlor, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 66 days.

(21) Appl. No.: 15/674,240

(22) Filed: Aug. 10, 2017

(65) Prior Publication Data

US 2019/0051013 A1   Feb. 14, 2019

(51) Int. Cl.
| | | |
|---|---|---|
| *G06T 7/73* | (2017.01) | |
| *G06T 7/77* | (2017.01) | |
| *H04L 29/06* | (2006.01) | |
| *G06F 16/583* | (2019.01) | |

(52) U.S. Cl.
CPC ............ *G06T 7/75* (2017.01); *G06T 7/77* (2017.01); *G06F 16/583* (2019.01); *G06T 2200/28* (2013.01); *G06T 2207/10016* (2013.01); *G06T 2207/10028* (2013.01); *G06T 2207/20104* (2013.01); *G06T 2207/30164* (2013.01); *G06T 2207/30201* (2013.01); *G06T 2207/30232* (2013.01); *G06T 2207/30252* (2013.01); *H04L 63/065* (2013.01)

(58) Field of Classification Search
CPC combination set(s) only.
See application file for complete search history.

(56) References Cited

U.S. PATENT DOCUMENTS

| | | | |
|---|---|---|---|
| 6,532,304 B1 | 3/2003 | Liu et al. | |
| 7,227,995 B1 * | 6/2007 | Reihani | G06K 9/00416 382/177 |
| 7,639,868 B1 * | 12/2009 | Regli | G06N 20/00 382/159 |

(Continued)

OTHER PUBLICATIONS

Chang et al., "Image Retrieval Based on Region Shape Similarity", SPIE Proceedings, Storage and Retrieval for Media Databases, vol. 4315, No. 31, Jan. 2001, 8 Pages.

(Continued)

*Primary Examiner* — Tsung Yin Tsai
(74) *Attorney, Agent, or Firm* — Ditthavong & Steiner, P.C.

(57) ABSTRACT

An approach is provided for an asymmetric evaluation of polygon similarity. The approach, for instance, involves receiving a first polygon representing an object depicted in an image. The approach also involves generating a transformation of the image comprising image elements whose values are based on a respective distance that each image element is from a nearest image element located on a first boundary of the first polygon. The approach further involves determining a subset of the plurality of image elements of the transformation that intersect with a second boundary of a second polygon. The approach further involves calculating a polygon similarity of the second polygon with respect the first polygon based on the values of the subset of image elements normalized to a length of the second boundary of the second polygon.

20 Claims, 14 Drawing Sheets

(56) References Cited

U.S. PATENT DOCUMENTS

| | | | |
|---|---|---|---|
| 7,844,106 B2 | 11/2010 | Pfister et al. | |
| 8,253,802 B1* | 8/2012 | Anderson | G06T 7/149 |
| | | | 348/169 |
| 8,285,052 B1 | 10/2012 | Bhattacharyya et al. | |
| 9,177,225 B1* | 11/2015 | Cordova-Diba | G06T 5/00 |
| 9,349,189 B2 | 5/2016 | Zhang et al. | |
| 10,452,956 B2* | 10/2019 | Kwant | G06N 3/08 |
| 2003/0174877 A1* | 9/2003 | Aiger | G01R 31/2801 |
| | | | 382/145 |
| 2009/0232358 A1* | 9/2009 | Cross | G06K 9/00818 |
| | | | 382/103 |
| 2011/0091113 A1* | 4/2011 | Ito | G06K 9/00315 |
| | | | 382/197 |
| 2011/0103691 A1 | 5/2011 | Yun | |
| 2012/0087568 A1* | 4/2012 | Stellari | G06T 7/30 |
| | | | 382/149 |
| 2013/0156305 A1* | 6/2013 | Prasad | G06T 7/11 |
| | | | 382/164 |
| 2013/0217996 A1* | 8/2013 | Finkelstein | A61B 5/1075 |
| | | | 600/407 |
| 2015/0254857 A1* | 9/2015 | Huang | G06F 19/00 |
| | | | 382/154 |
| 2015/0278632 A1* | 10/2015 | Rodriguez-Serrano | |
| | | | G06K 9/468 |
| | | | 382/160 |
| 2017/0083762 A1 | 3/2017 | Segalovitz et al. | |
| 2017/0084030 A1 | 3/2017 | Coradi et al. | |
| 2019/0041217 A1* | 2/2019 | Ben-Moshe | G06T 7/74 |

OTHER PUBLICATIONS

Avbelj et al., "A Metric for Polygon Comparison and Building Extraction Evaluation", IEEE Geoscience and Remote Sensing Letters, vol. 12, No. 1, Jan. 2015, 5 Pages.

Wikipedia, "Jaccard Index", retrieved on May 25, 2017 from https://en.wikipedia.org/wiki/Jaccard_index, 4 Pages.

Wikipedia, "Earth Mover's Distance", retrieved on May 25, 2017 from https://en.wikipedia.org/wiki/Earth_mover's_distance, 3 Pages.

Arkin et al., "An Efficiently Computable Metric for Comparing Polygonal Shapes", IEEE Transactions on Pattern Analysis and Machine Intelligence, vol. 13, No. 3, Mar. 1991, pp. 209-216.

Veltkamp, "Shape Matching: Similarity Measures and Algorithms", SMI 2001 International Conference on Shape Modeling and Applications, IEEE, May 7-11, 2001, 10 Pages.

* cited by examiner

FIG. 4A

| 2 | 2 | 2 | 2 | 1 | 1 | 1 | 1 | 2 | 3 |
|---|---|---|---|---|---|---|---|---|---|
| 1 | 1 | 1 | 1 | 0 | 0 | 0 | 1 | 2 | 3 |
| 1 | 0 | 0 | 0 | 0 | 1 | 0 | 1 | 2 | 3 |
| 1 | 0 | 1 | 1 | 1 | 1 | 0 | 1 | 2 | 3 |
| 1 | 0 | 1 | 2 | 2 | 1 | 0 | 1 | 2 | 2 |
| 1 | 0 | 1 | 2 | 2 | 1 | 0 | 0 | 1 | 2 |
| 1 | 0 | 1 | 2 | 2 | 2 | 1 | 0 | 1 | 2 |
| 1 | 0 | 0 | 1 | 2 | 2 | 1 | 0 | 1 | 2 |
| 2 | 1 | 0 | 1 | 2 | 2 | 1 | 0 | 1 | 2 |
| 2 | 1 | 0 | 1 | 1 | 1 | 1 | 0 | 1 | 2 |
| 2 | 1 | 0 | 1 | 0 | 0 | 0 | 0 | 1 | 2 |
| 2 | 1 | 0 | 0 | 0 | 1 | 1 | 1 | 1 | 2 |

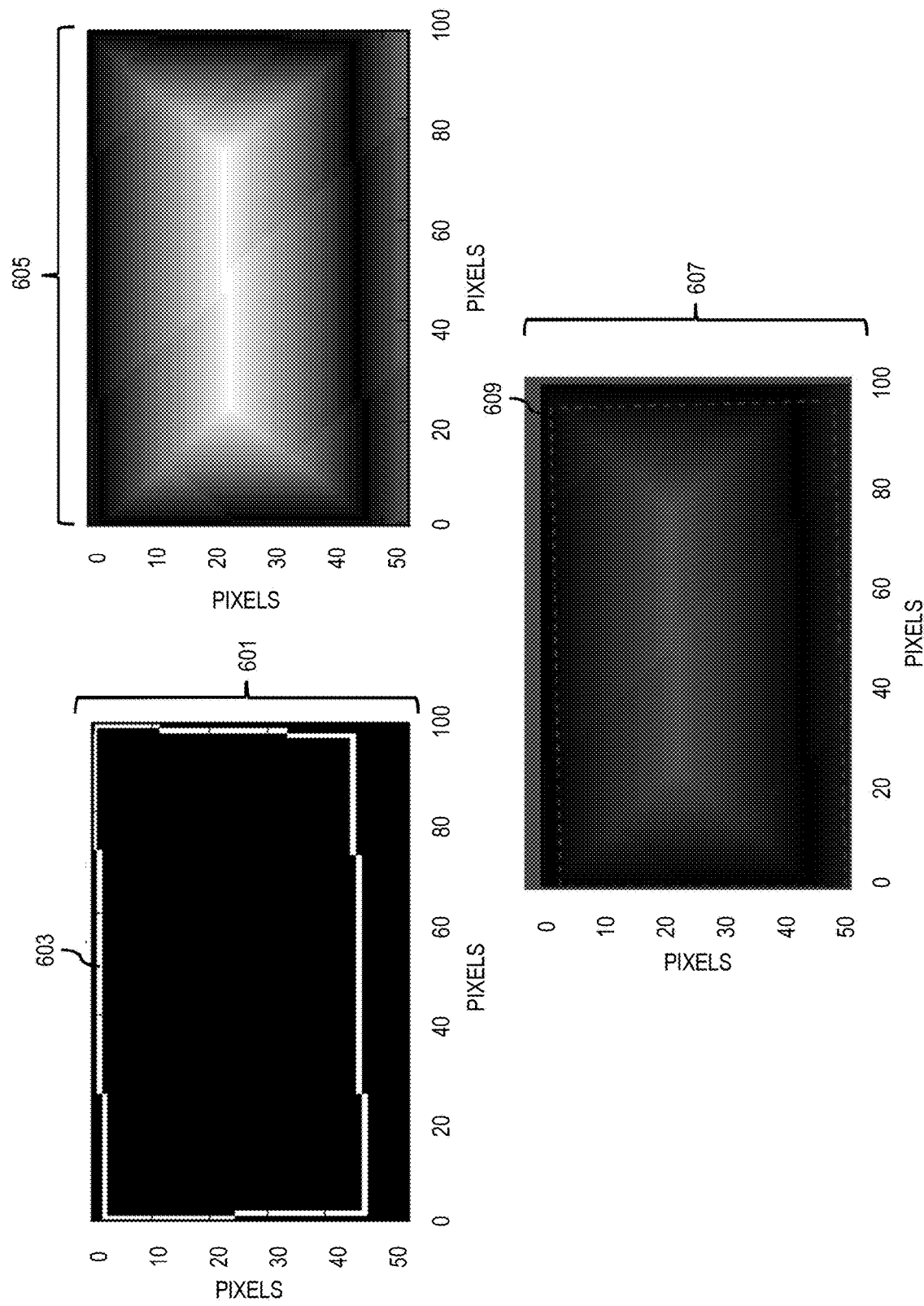

METHOD, APPARATUS, AND SYSTEM FOR AN ASYMMETRIC EVALUATION OF POLYGON SIMILARITY

BACKGROUND

Object detection has recently seen a surge of intense research interest, driven by applications in diverse fields such as video surveillance, the internet of things (IoT), and autonomous driving. While the particulars of individual use-cases may differ significantly, the basic premise of object detection remains constant: given a raster image (or sequence of images), identify the pixels corresponding to a particular object of interest, and construct polygonal boundaries or polygons to represent the object of interest from the identified pixels. However, the question of evaluating the quality of the object detections (e.g., quality of the polygonal representations of the objects) continues to present technical challenges.

SOME EXAMPLE EMBODIMENTS

Therefore, there is a need for an approach for determining polygon similarity as an indicator of object detection quality for a computer vision system.

According to one embodiment, a computer-implemented method for evaluating polygon similarity using a computer vision system comprises receiving a first polygon representing an object depicted in an image. The first polygon is determined from the image by the computer vision system. The method also comprises generating a transformation of the image. The transformation comprises a plurality of image elements (e.g., pixels or groups of pixels) whose values are based on a respective distance that each of the plurality of image elements is from a nearest image element of the plurality of image elements that is located on a first boundary of the first polygon. The method further comprises determining a subset of the plurality of image elements of the transformation that intersect with a second boundary of a second polygon. The method further comprises calculating a polygon similarity of the second polygon with respect the first polygon based on the values of the subset of the plurality of image elements normalized to a length of the second boundary of the second polygon.

According to another embodiment, an apparatus for evaluating polygon similarity using a computer vision system comprises at least one processor, and at least one memory including computer program code for one or more computer programs, the at least one memory and the computer program code configured to, with the at least one processor, cause, at least in part, the apparatus to receive a first polygon representing an object depicted in an image. The first polygon is determined from the image by the computer vision system. The apparatus is also caused to generating a transformation of the image. The transformation comprises a plurality of image elements whose values are based on a respective distance that each of the plurality of image elements is from a nearest image element of the plurality of image elements that is located on a first boundary of the first polygon. The apparatus is further caused to determine a subset of the plurality of image elements of the transformation that intersect with a second boundary of a second polygon. The apparatus is further caused to calculate a polygon similarity of the second polygon with respect the first polygon based on the values of the subset of the plurality of image elements normalized to a length of the second boundary of the second polygon.

According to another embodiment, a non-transitory computer-readable storage medium for evaluating polygon similarity using a computer vision system carries one or more sequences of one or more instructions which, when executed by one or more processors, cause, at least in part, an apparatus to receive a first polygon representing an object depicted in an image. The first polygon is determined from the image by the computer vision system. The apparatus is also caused to generating a transformation of the image. The transformation comprises a plurality of image elements whose values are based on a respective distance that each of the plurality of image elements is from a nearest image element of the plurality of image elements that is located on a first boundary of the first polygon. The apparatus is further caused to determine a subset of the plurality of image elements of the transformation that intersect with a second boundary of a second polygon. The apparatus is further caused to calculate a polygon similarity of the second polygon with respect the first polygon based on the values of the subset of the plurality of image elements normalized to a length of the second boundary of the second polygon.

According to another embodiment, an apparatus for evaluating polygon similarity using a computer vision system comprises means for receiving a first polygon representing an object depicted in an image. The first polygon is determined from the image by the computer vision system. The apparatus also comprises means for generating a transformation of the image. The transformation comprises a plurality of image elements whose values are based on a respective distance that each of the plurality of image elements is from a nearest image element of the plurality of image elements that is located on a first boundary of the first polygon. The apparatus further comprises means for determining a subset of the plurality of image elements of the transformation that intersect with a second boundary of a second polygon. The apparatus further comprises means for calculating a polygon similarity of the second polygon with respect the first polygon based on the values of the subset of the plurality of image elements normalized to a length of the second boundary of the second polygon.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 4A and 4B are diagrams illustrating an example of calculating a polygon similarity of a second polygon with respect to a first polygon, according to one embodiment;

FIGS. 5A and 5B are diagrams illustrating an example of calculating an asymmetric polygon similarity pair for the example of FIGS. 4A and 4B by calculating a polygon similarity of the first polygon with respect to the second polygon, according to one embodiment;

FIG. 6 is a diagram illustrating an example of using a visual representation to depict a distance transformation for evaluating polygon similarity, according to one embodiment;

DESCRIPTION OF SOME EMBODIMENTS

Examples of a method, apparatus, and computer program for providing an asymmetric evaluation of polygon similarity are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
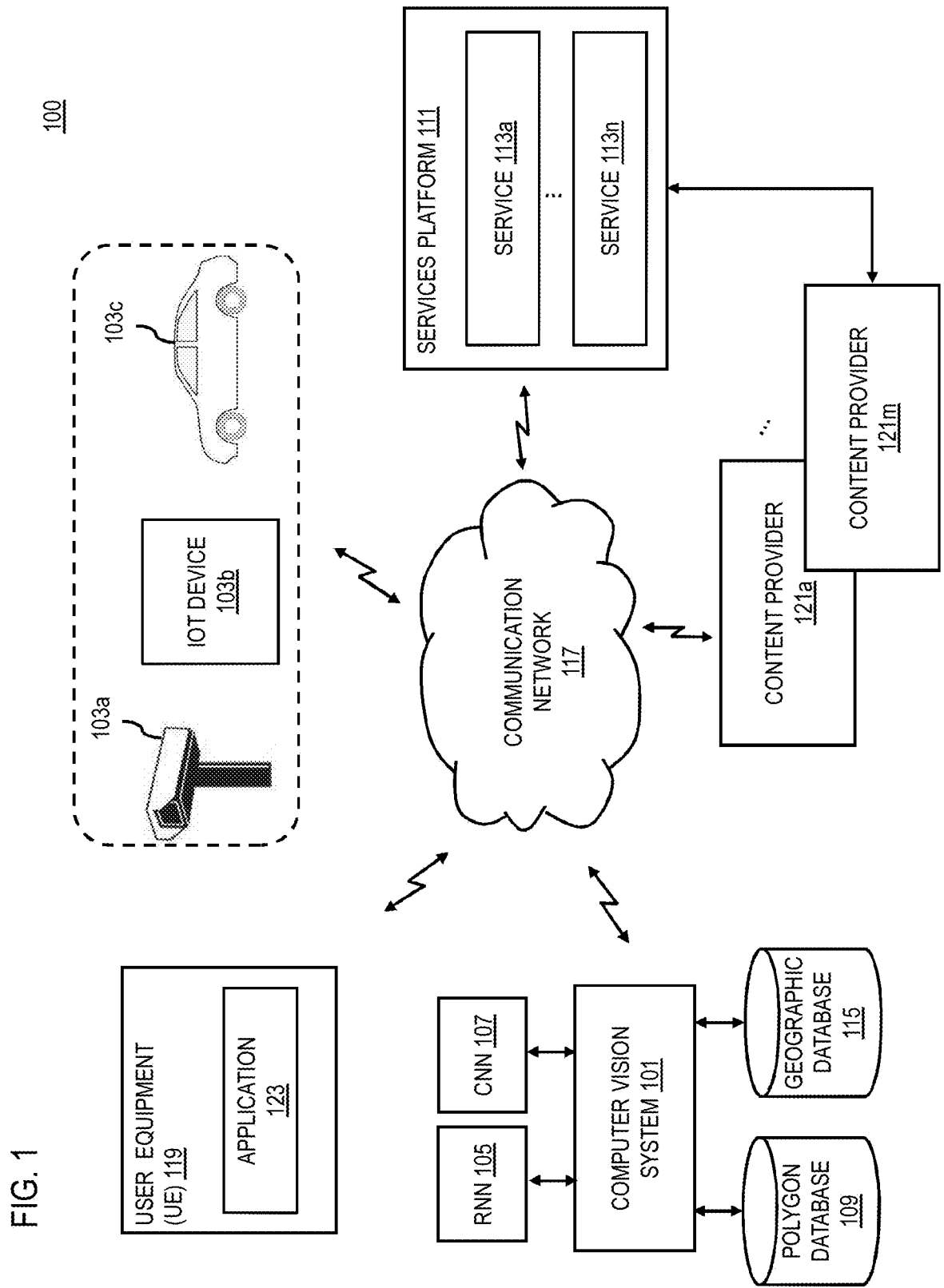
FIG. 1 is a diagram of a system capable of providing an asymmetric evaluation of polygon similarity, according to one embodiment.

FIG. 1 is a diagram of a system capable of providing an asymmetric evaluation of polygon similarity, according to one embodiment. As discussed above, object detection from image data (e.g., rasterized images or a sequence of images, such as a video, made from pixels) is spurring intense interest in the development of new and compelling use cases and/or services such as, but not limited to, video surveillance, the internet of things (IoT), autonomous driving, and/or the like. For example, in the case of video surveillance, the objects might be faces, people, or vehicles captured by a surveillance camera 103a; in IoT, they might include shipping containers, items cooking in an oven, and/or any other object of interest to an IoT device 103b; and for autonomous driving, they might include roadside signs, guardrails, or other vehicles captured by an autonomous vehicle 103c.

In one embodiment, objection detection refers to a process performed by a computer vision system 101 of capturing or otherwise obtaining an image (e.g., rasterized images or a sequence of images, such as a video, made from pixels) depicting an object of interest. The computer vision system 101 than uses any process known in the art to identify the pixels corresponding to the particular object of interest (e.g., machine learning processes using a recurrent neural network (RNN) 105, convolutional neural network (CNN) 107, or equivalent). The computer vision system 100 then uses axis-aligned bounding boxes or other polygonal boundaries to represent the shape of the identified pixels corresponding to the object of interest. Therefore, regardless of the use case (e.g., video surveillance, IoT, autonomous driving, etc.), a primary input for initiating respective services or functions of the use cases are the polygons generated by the computer vision system 101.

Accordingly, evaluating the quality of object detections is a significant technical challenge when using the computer vision system 101 for any of the use-cases mentioned above. For example, an evaluation method must meet the technical requirements of a desired behavior or function of the object detection system under a desired use case, and then choose an evaluation metric which encourages these desiderata to ensure that object detection performance meets the performance requirements of each use case. For example, in various embodiments, polygon similarity can be used to confirm a detected object and/or its identification, identify object movements, match detected objects to a library of objects (e.g., reference polygon objects stored in the polygon data 109), and/or any other function supported by an object detection use case, including those not specifically discussed herein.

In the field of object detection, one traditional metric for evaluating the similarity between two polygons is known as Intersection-over-Union (IoU) or the Jaccard Index. In this metric, the area of the intersection of two polygons is divided by the area of their union to indicate how similar the two polygons are. For example, two polygons which are completely disjointed would have IoU equal to zero, while two co-incident polygons would have IoU equal to one. Typically, a threshold is set (e.g., 0.5) below which the two polygons are said to be dissimilar; otherwise the polygons are said to be similar. This metric is useful in a number of contexts, in particular where the scale of the objects under consideration is accurately reflected by their areas.

Other metrics that have been used to evaluate similarity of polygons include: earth-mover distance (EMD), turning angle distance, and symmetric difference over union. These alternative metrics emphasize different notions of similarity, such as similarity in shape vs. similarity in position. However, these approaches tend share a common feature: polygon size affects the scale at which the metric is sensitive. For example, consider the IoU approach described above. A 10 pixel by 10 pixel square that is predicted to be 1 pixel to the right is penalized more than a 100 pixel by 100 pixel square that is predicted to be 1 pixel to the right. This occurs because the metric is normalized by the polygon area. While this behavior makes sense for generic object detection, it is not ideal in all circumstances. For example, algorithms that localize a camera pose based on the locations of detected polygons are sensitive to the absolute error in the polygon location. In cases such as these, it is important to judge the quality of predictions on a scale that is more absolute to improve the technical performance and efficiency of the computer vision system 101.

To address this problem, the system 100 introduces a computer vision system 101 that uses polygon similarity metric which is sensitive to the location of the edges of polygonal features (e.g., edges of two-dimensional polygons, three-dimensional polygons, or higher N-dimensional polygons). In one embodiment, this approach to evaluating polygon similarity is based applying a distance transformation with respect to the boundaries or edges of a polygonal representation of an object detected in an input image, thereby improving a technical capability of the computer vision system 101 to detect fine edge differences between two polygons or detected objects. While the traditional IoU metric can also be sensitive to edge locations, it is normalized by an area term which has the effect of dampening this sensitivity for large objects. This behavior can be undesirable when small deviations in the edge locations of large polygons are informative, such as in vehicle localization contexts. The various embodiments described herein overcome this technical limitation of the traditional approach by normalizing the polygon similarity metric by the perimeter of the polygon instead the polygon area of the traditional approach, which scales at a much lower rate as the size of the polygon increases. In this way, the computer vision system 101 employing the polygon similarity metric generated according to the various embodiments described herein can advantageously improve its technical capabilities by increasing the sensitivity of the computer vision system 101 to boundary differences between two polygons.

In addition, the embodiments of polygon similarity determined according to the various embodiments described herein are asymmetric, meaning that the polygon similarity of a first polygon to a second polygon is not generally equal to the polygon similarity of the second polygon to the first polygon. The asymmetry of the embodiments of polygon similarity described herein is distinct from other traditional evaluation metrics, and results in a technical improvement of the computer vision system 101 by enabling a finer measure of granularity in the polygon similarity evaluation process. In use cases where asymmetry is not needed or used, the computer vision system 101 can report either of the asymmetric values as individual values, or combine the asymmetric value into a single symmetric value, for instance, by averaging the asymmetric values or performing another equivalent operation.

It is further noted that the embodiments of the polygon similarity based on distance transforms as described herein treat polygons as one-dimensional objects; that is, they are described by their perimeters. In contrast, the traditional IoU treats polygons as two-dimensional objects described by their areas. For use cases, in which the edges of the detected object are of primary importance, the embodiments of polygon similarity described herein represent a more faithful measure of the quality of detected objects.

Figure 2:
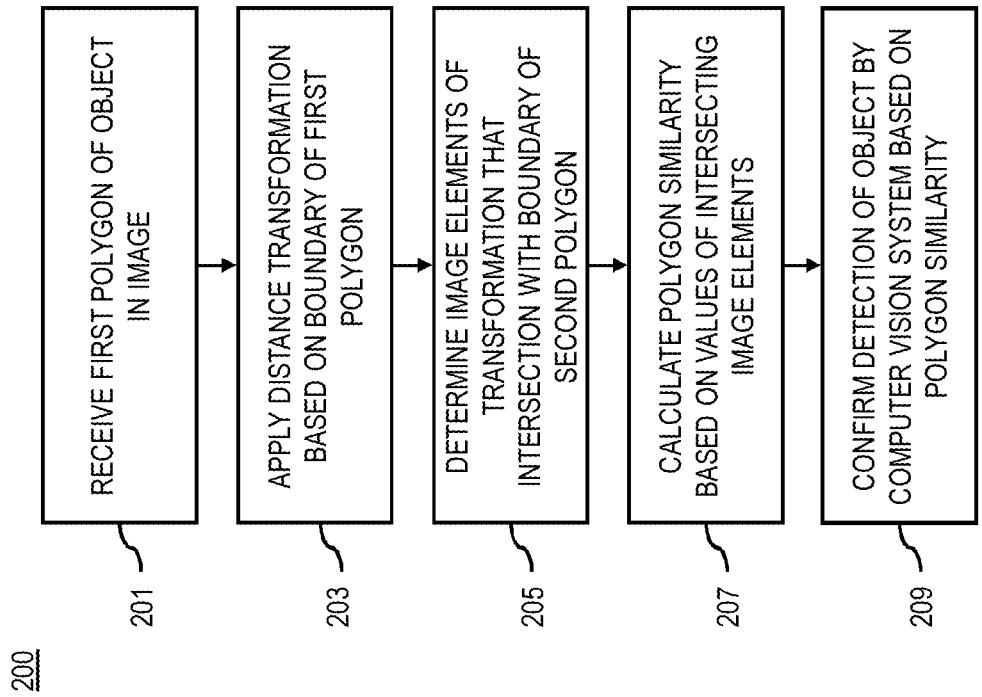
FIG. 2 is a flowchart of a process for providing an asymmetric evaluation of polygon similarity, according to one embodiment.
Figure 10:
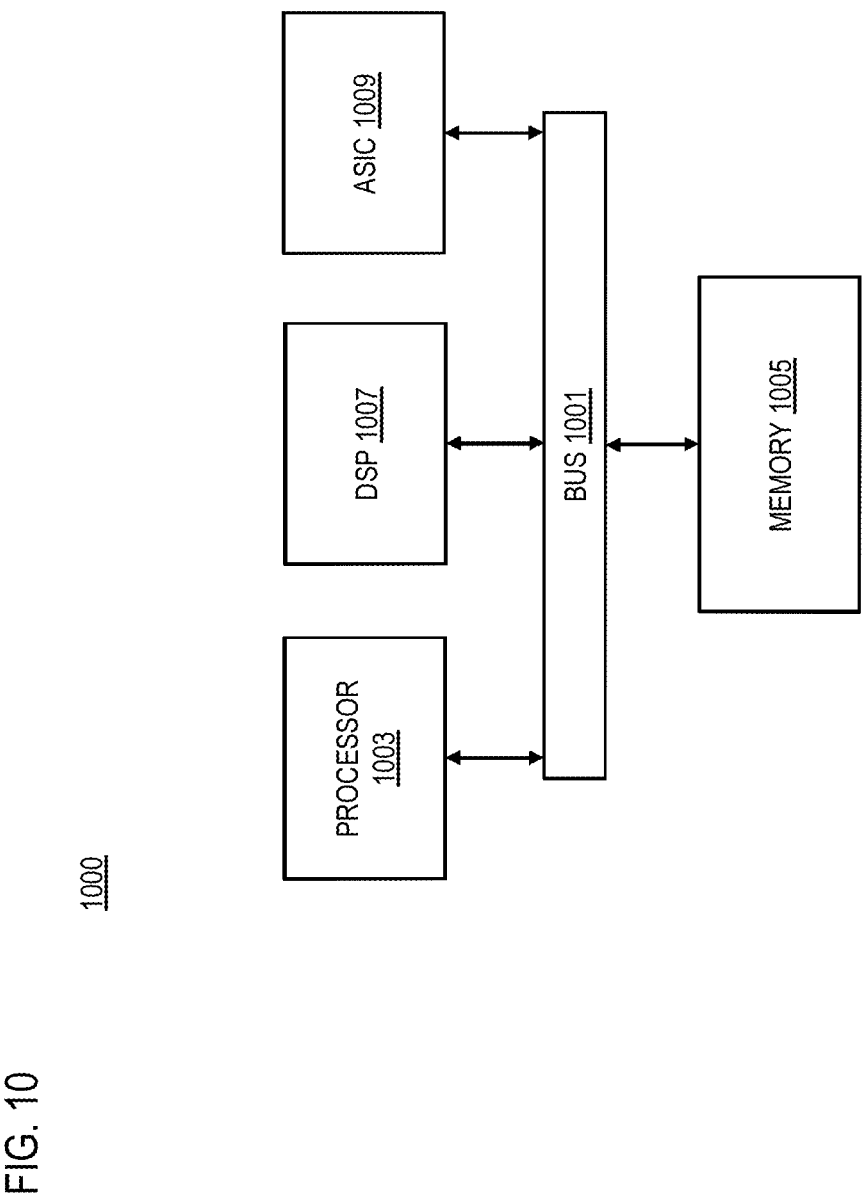
FIG. 10 is a diagram of a chip set that can be used to implement an embodiment of the invention.

FIG. 2 is a flowchart of a process for providing an asymmetric evaluation of polygon similarity, according to one embodiment. In one embodiment, the computer vision system 101 may perform one or more portions of the process 200 and may be implemented in, for instance, a chip set including a processor and a memory as shown in FIG. 10. As such, the computer vision system 101 can provide means for accomplishing various parts of the process 200. In addition or alternatively, a services platform 111 and/or one or more services 113*a*-113*n* (also collectively referred to as services 113) may perform any combination of the steps of the process 200 in combination with the computer vision system 101 or as standalone components. Although the process 200 is illustrated and described as a sequence of steps, it is contemplated that various embodiments of the process 200 may be performed in any order or combination and need not include all of the illustrated steps. The process 200 is discussed with respect to the examples of FIGS. 3-7 below.

For illustration, the embodiments of the process 200 are described with respect to detecting objects depicted in an image or sequence of images as two-dimensional polygons. However, it is contemplated that the embodiments described herein can be generalized to a N-dimensional setting in which objects and/or corresponding polygons of any N-dimensions can be detected (e.g., three-dimensional polygons). For example, with respect to two-dimensional polygonal representation of objects, the edges of the polygonal representations are one-dimensional lines. With respect to three-dimensional representations, the edges of the objects are two-dimensional planes cutting through three-dimensional space. Application of the various embodiments described herein to higher dimensions can then be generalized to N-dimensional representations whose edges are (N−1)-dimensional hyperplanes that cut through a N-dimensional space.

In one embodiment, the input image can be a raster image of size m by n image elements (that is, m rows and n columns of image elements). In this example, an image element refers to an element or cell of a grid created by the m rows and n columns of the raster image. In one embodiment, each image element corresponds to an individual pixel of the raster image, so that the number of rows and columns correspond to the pixel resolution of the image. Alternatively, each image element can refer to a group of pixels (e.g., 4 pixels of a 2×2 pixel group, 9 pixels of a 3×3 pixel group, 16 pixels of a 4×4 pixel group, etc.). Accordingly, it is contemplated that references to an image element can be used interchangeably with a pixel, and vice versa in the description of the embodiments described herein. In this way, in one embodiment, the computer vision system 101 can effectively downsample a higher resolution input image to reduce computer resource usage when a higher resolution of the input image is not needed or desired for a given use case. Although the image elements are described with respect to a two-dimensional image, it is contemplated that the image element can a three-dimensional image element (e.g., a cube version of a pixel), or a higher N dimension depending on the dimensional space of the polygons being compared.

To prepare the input image or images for input into the process 200, the computer vision system 100 can use any object detection approach known in the art (e.g., machine learning-based object detection using a CNN 107 and/or RNN 105) to generate polygon representations of detected objects. For example, convolutional neural networks such as the CNN 107 have shown unprecedented ability to recognize objects in images, understand the semantic meaning of images, and segment images according to these semantic categories. In one embodiment, the CNN 107 can be used in combination with the RNN 105 to trace the contours an objected detected in the input image to generate a polygon representation. For example, the computer vision system 101 can use the RNN 105 or other equivalent machine learning or neural network to traverse a feature map (e.g., a convolutional feature map encoding object features detected from an input image by the CNN 107) like a cursor (e.g., a cursor recurrent neural network). During the traversal, the RNN 105 uses information from its current location in the feature map to determine a location where the RNN 105 should go next to follow a detected contour of an object depicted in an input image.

In one embodiment, the output of the object detection process includes polygons representing the edges or boundaries of detected objects. For example, the object detection processes can produce at least two polygons representing detected objects that can be evaluated for polygon similarity according to the various embodiments described herein. In this example, the output includes a first polygon p and a second polygon q, which can be wholly contained in at least one of the input raster images. In one embodiment, the first polygon p, the second polygon q, or a combination thereof is represented as list of polygon vertices in a data structure of (x, y) pairs representing the vertices. The computer vision system 101 can then construct the boundaries the first polygon p and/or the second polygon q from the list of polygon vertices.

Figure 3:
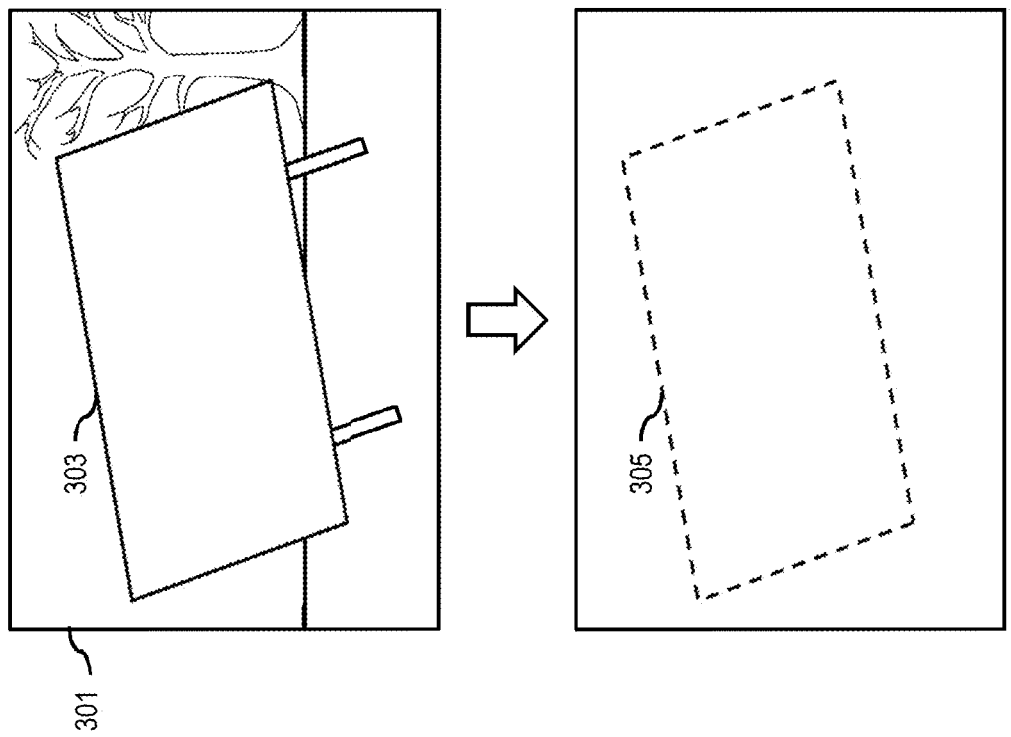
FIG. 3 is a diagram illustrating an example of object detection from an input image by a computer vision system, according to one embodiment.

Accordingly, in step 201, the computer vision system 101 receives a first polygon p representing an object depicted in an image. This first polygon p is determined from the image by the computer vision system 101 as described above. FIG. 3 is a diagram illustrating an example of object detection from an input image by a computer vision system, according to one embodiment. As shown in FIG. 3, an input image 301 is processed by the computer vision system 101 to identify pixels of the image corresponding to a sign 303 (e.g., the object of interest). In this example, the computer vision system 101 uses machine learning (e.g., the RNN 105 and/or CNN 107) or other equivalent processes to classify each pixel of the input image 301 as belonging to the depicted sign 303 or belonging to other objects/features depicted in the image (e.g., ground, sky, or trees). The output of this process is illustrated as the polygon 305 of FIG. 3 representing the sign 303 (e.g., the object of interest). Although the example of FIG. 3 results in a polygon p that is a closed convex polygon, it is contemplated that the polygon p and/or q can be an open polygon, a closed polygon, a concave polygon, a convex polygon, or any combination thereof comprising any combination of detected polygonal boundaries. In one embodiment, the object can be any object depicted in the image including both the edges and the area encompassed by the edges. In another embodiment, the object can be an edge-based object where the edge is the object of interest (e.g., edges of a sign, contours of a face, etc.) such that the boundary of the first polygon p is a representation of the edge-based object.

In step 203, the computer vision system 101 generates a transformation of the input image using the boundary of the first polygon p received according to step 201. In one embodiment, the transformation comprises generating a plurality of image elements whose values are based on a respective distance that each of the plurality of image elements is from a nearest image element of the plurality of image elements that is located on a boundary of the first polygon p. In one embodiment, each of the plurality of image elements represents a pixel or a group of pixels of the image, the transformation, or a combination thereof. In other words, the transformation is based on a distance transform of the pixels or image elements with respect to the detected boundary of the polygon p. By way of example, the distance transform of a polygon p depicted in an input image of a size m by n pixels is another image of size m by n pixels whose pixel values are given by the distance from that pixel to the nearest pixel on the boundary of the polygon p. For example, the distance transformation of the polygon p can be denoted as DT(p).

In one embodiment, the specific "distance" or value scales to use for the distance transformation of the image elements can be tailored to a particular use case. For example, the distance that can be used with the embodiments described herein includes, but is not limited to, a Euclidean distance, city-block distance, chessboard distance, or any other equivalent or known distance metric. In one embodiment, the computer vision system 101 can determine which distance metric to use for the distance transform based on a specified use or preference of the computer vision system 101.

FIG. 4A continues the example of FIG. 3 and depicts a distance transform of the polygon 305 recognized from the input image 301 of FIG. 3. In this example, the input image has a size of 12 by 10 image elements (e.g., pixels or group of pixels), and so the transformation 401 as shown in FIG. 4A also has a corresponding size of 12 by 10 image elements. In one embodiment, image elements of the transformation 401 on which the boundary 403 of the polygon 305 is located are assigned a value of 0. The value of other image elements not falling on the boundary 403 is based on the distance to the nearest element on the boundary 403. Image elements that are farther from the boundary 403 (e.g., both within the boundary 403 and outside the boundary 403) have increasing distance values. In this example, the unit of distance is expressed as the number of image elements based a Euclidean distance. As noted above, any other distance metric (e.g., city-block or Manhattan distance, chessboard distance, etc.).

To initiate the evaluation of polygon similarity between the first polygon p and a second polygon q, the computer vision system 101 selects or receives an input for selecting the second polygon q that is to be compared. The computer vision system 101 then determines the boundary of the selected second polygon q. For example, if polygon q is described as a list of polygon vertices, the computer vision system 101 can determine the boundary by connecting the vertices using line segments, or any other equivalent process to construct the boundary (e.g., connecting the vertices using curves or other shapes). In one embodiment, the second polygon q can be a polygon recognized by the computer vision system 101 from the same input image, and/or another input image (e.g., a subsequent image frame in a video). In addition or alternatively, the second polygon q may be a reference or ground truth polygon that is constructed as an ideal or reference representation of an object of interest, and need not be extracted from any image. In step 205, the computer vision system 101 determines a subset (e.g., a set $I_q$) of the plurality of image elements of the transformation created with respect to the first polygon p that intersect with the boundary of the second polygon q. For example, $I_q$ can be determined as follows:

$$I_q = DT(p) \cap B_q \quad (1)$$

where $I_q$=set of intersecting image elements, DT(p)=distance transformation of the first polygon p, and $B_q$=boundary of the second polygon q.

Figure 4B:
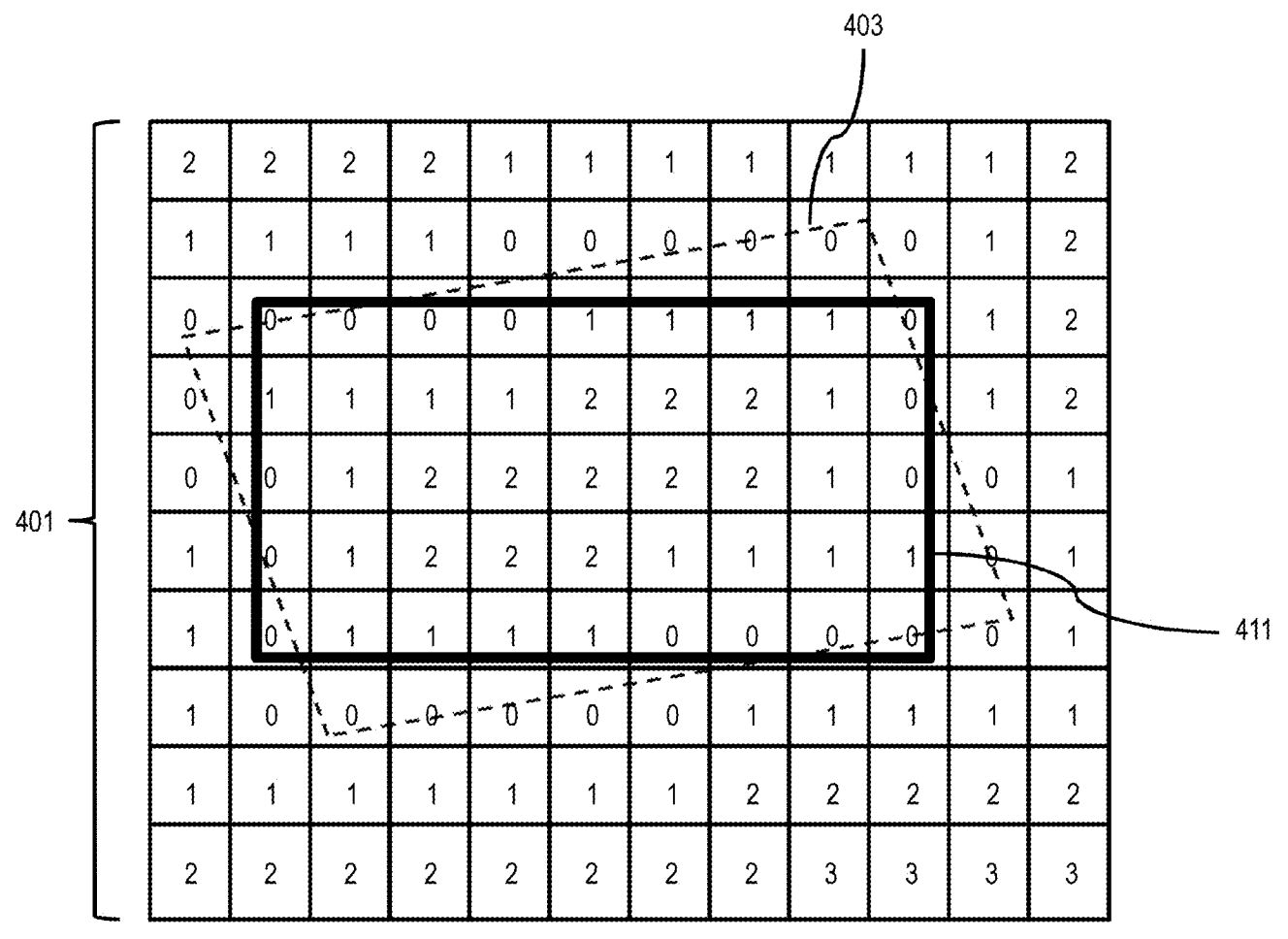

FIG. 4B is a diagram illustrating an example of determining the set intersecting image elements $I_q$, according to one embodiment. FIG. 4B illustrates the distance transformation 401 of the first polygon p as shown in FIG. 4A (e.g., DT(p)) with the boundary of the second polygon q overlaid (e.g., $B_q$). In one embodiment, $B_q$ identifies the set of image elements (e.g., pixels or group of pixels) of the transformation 401 on which the boundary of the second polygon q falls. As described above, the intersecting elements is represented as the set $I_q$ containing n intersecting image elements.

In step 207, the computer vision system 101 calculates a polygon similarity of the second polygon q with respect the first polygon p based on the values of the subset of the plurality of image elements ($I_q$) normalized to a length of the boundary of the second polygon q. In one embodiment, the length of the boundary of the second polygon q is quantified based on an individual image element as a length unit. Accordingly, in one embodiment, the polygon similarity metric is a distance transform of the second polygon q with respect to the first polygon p, which is denoted as DT(q, p) and can be determined as follows:

$$DT(q, p) = \frac{\sum_{i=1}^{n} ElementVal_i \in I_q}{\text{Length of } B_q} \quad (2)$$

where n=number of image elements ($Element_i$) in the set $I_q$ and $ElementVal_i$ is the distance transformation value of each corresponding $Element_i$ in the set $I_q$. In addition, when the length of the boundary of the second polygon q, $B_q$, is expressed or measured using the number of image elements or pixels as the length unit, the number of image elements n in $I_q$ is also the length of $B_q$ (i.e., length of $B_q$=n) which simplifies the equation above to:

$$DT(q, p) = \frac{\sum_{i}^{n} ElementVal_i \in I_q}{n} \quad (3)$$

In other words, given the distance transform of p, DT(p), the computer vision system 101 defines the distance transform metric of q with respect to p, DT(q, p) as the average value of p's distance transform on the image elements pixels forming the boundary of q, $B_q$. In the example of FIG. 4B, the computer vision system 101 sums the distance transform values of the image elements or pixels along the boundary 411 of the second polygon q and divides by the length of the boundary 411. In this example, the values of the set of image elements $I_q$ intersecting the boundary 411 is {0, 0, 0, 0, 1, 1, 1, 1, 0, 0, 0, 1, 0, 0, 0, 0, 1, 1, 1, 1, 0, 0, 0, 1} (e.g., beginning from the top left vertex of the boundary 411) for a total of 24 image elements along the boundary 411. The distance metric DT(q, p) for this example therefore is calculated as follows:

$$DT(q, p) = \frac{10}{24} = 0.417$$

The resulting value for DT(q, p) represents the average distance each image element or pixel on the boundary of the second polygon q is from the boundary of the first polygon p to which it is compared. A zero value indicates that the boundaries or edges of the two polygons p and q are coincident, and higher values indicate greater distances. According to this metric, there is a lower bound of 0 for the metric and no upper bound (e.g., meaning that the boundary of polygon q is on average infinitely far from the boundary of the polygon p). In one embodiment, the specific threshold or actionable level (e.g., threshold to distinguish between similar and non-similar polygons) can depend on the use case.

Note that a polygon similarity determined according to distance transformation metric (e.g., DT(q, p)) is normalized by the length of the perimeter of one of the two polygons being compared, rather than the area of their union in the case of the traditional IoU. For use-cases in which the edges of the detected polygons are the objects of interest, the polygon similarity using a distance transform according to the various embodiment described herein provides a more direct indication of similarity, and advantageously improves the sensitivity of the computer vision system 101 when detecting fine edge differences.

As described previously, the embodiments of polygon similarity described herein are asymmetric such that DT(p, q) is not in general equal to DT(q, p). This asymmetry provides for a finer measure of granularity in the polygon evaluation process: e.g., it may be the case that polygon q is considered "close" to polygon p but not vice-versa. In one example use case, if polygon p represents a ground-truth object, and polygon q a predicted object, then the distance transform metric of p with respect to q, DT(p, q), is an indication of recall, while the distance transform metric of q with respect to p, DT(q, p) is an indication of precision.

Accordingly, in one embodiment, the computer vision system 101 can similarly determine DT(p, q) in addition to DT(q, p). For example, the computer vision system 101 can calculate a polygon similarity of the first polygon p with respect to the second polygon q, DT(p, q), by substituting the second polygon q for the first polygon p and vice versa in the embodiments of processes and equations described above. When substituting q for p and vice versa in equation 3 above, the distance transformation of the polygon p with respect to q can be denoted as follows:

$$DT(p, q) = \frac{\sum_{i}^{n} ElementVal_i \in I_p}{n} \quad (4)$$

where n=number of image elements (Element$_i$) in the set I$_p$ and ElementVal$_i$ is the distance transformation value of each corresponding Element$_i$ in the set I$_p$.

In one embodiment, the computer vision system 101 can generate a symmetric polygon similarity from the asymmetric pair of DT(p, q) and DT(q, p). For example, the computer vision can take an average, weighted average, or apply an equivalent process to the values of DT(p, q) and DT(q, p) to a determine a symmetric or non-paired value to represent the polygon similarity between the polygon p and the polygon q. In one embodiment, the symmetric polygon similarity, DT(p, q) can be denoted as:

$$DT(p,q)_{symmetric}=\text{Average}(DT(p,q),DT(q,p))$$

Figure 5A:
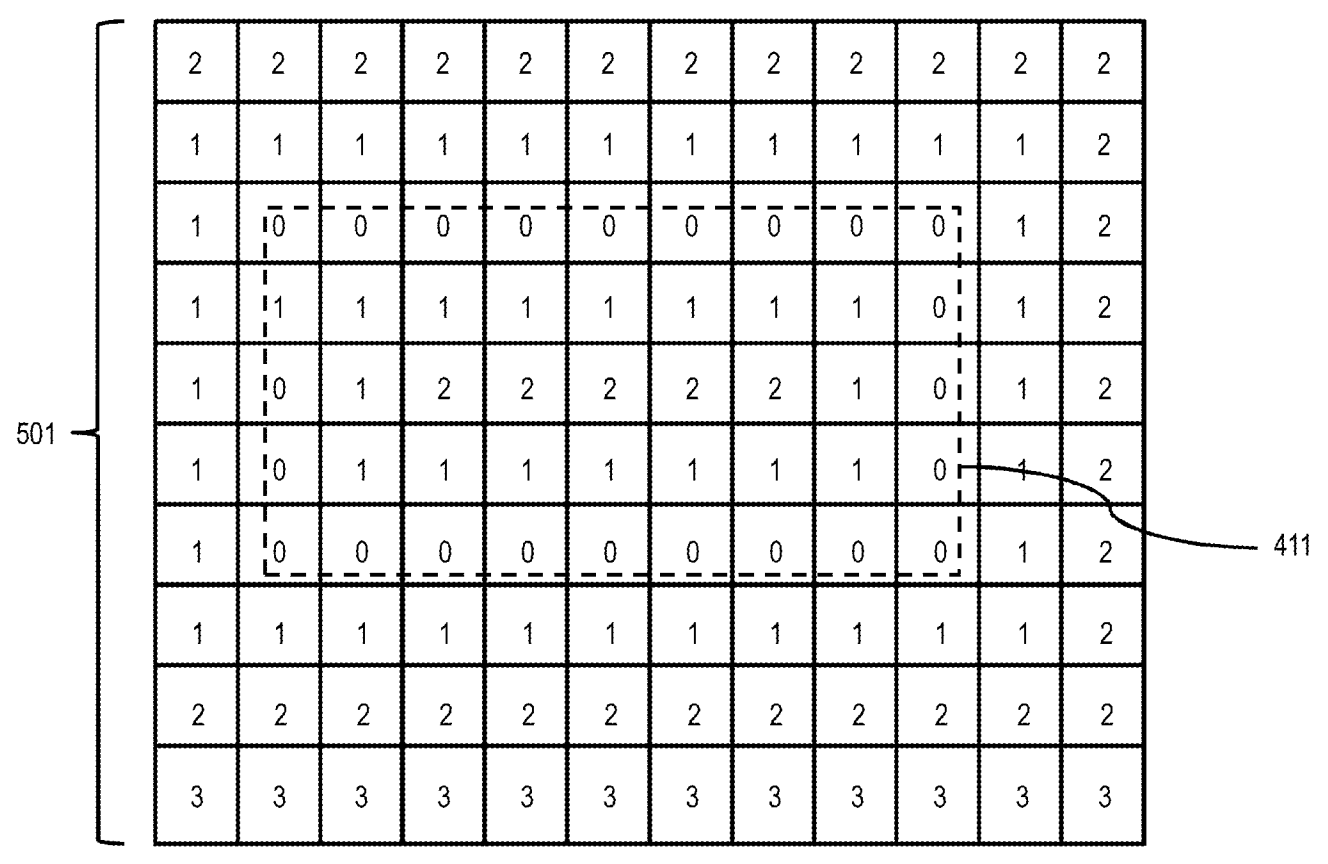
Figure 5B:
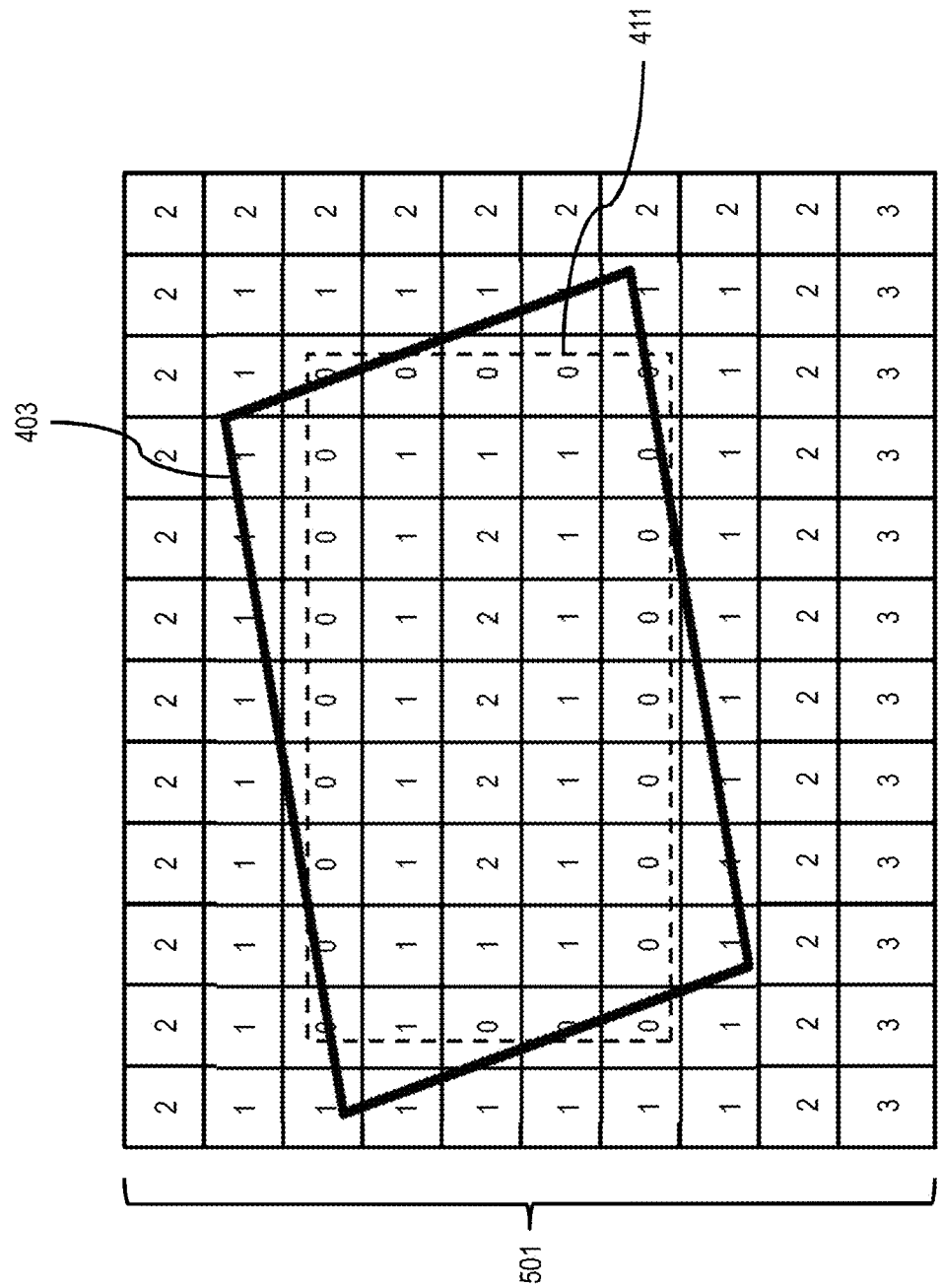

FIGS. 5A and 5B illustrate and example of reversing or substituting the polygons compared in the example of FIGS. 4A and 4B. As shown in FIG. 5A, the computer vision system 101 applies a distance transform based on the polygon boundary 411 to generate a transformation 501. Then, as shown in FIG. 5B, the computer vision system 101 applies the polygon boundary 403 to the transformation 501 to determine intersecting elements (e.g., I$_p$) for calculating a resulting polygon similarity. In contrast, FIG. 4A shows a transformation 401 based on the polygon boundary 403, and polygon boundary 411 was then used to determine intersecting image elements (e.g., I$_q$) in FIG. 4B. In the example of FIG. 5B, the values of the set of image elements I$_q$ intersecting the boundary 403 is {1, 0, 0, 0, 0, 1, 1, 1, 1, 1, 0, 0, 0, 1, 1, 1, 0, 0, 0, 1, 1, 1, 1, 1, 0, 0, 0, 0, 1, 1} (e.g., beginning from the top left vertex of the boundary 403) for a total of 30 image elements along the boundary 403. The distance metric DT(p, q) for this example therefore is calculated as follows:

$$DT(p,q) = \frac{17}{30} = 0.567$$

Comparing, this DT(p, q) value 0.567 to the DT(q, p) value 0.417 calculated previously, the asymmetry or difference is apparent. Semantically, the metrics indicate that the boundary of polygon q is closer in similarity to the boundary of polygon p than the boundary of polygon p is to the boundary of polygon q. As noted previously, the capability to detect this asymmetry can improve the performance of the computer vision system 101 (e.g., increase system sensitivity or granularity) when supporting use cases where the direction of comparison is important (e.g., distinguishing between recall and precision of object detection with respect to ground truth objects as previously described).

In one embodiment, when comparing two polygons p and q, the computer vision system 101 can calculate both a polygon similarity of the second polygon q with respect to the first polygon p, DT(q, p), and a polygon similarity of the first polygon p with respect to the second polygon q, DT(q, p). In this way, the computer vision system 101 can output an asymmetric polygon similarity for the first polygon p and the second polygon q as a pair comprising DT(q, p) and DT(q, p). This paired asymmetric polygon similarity, DT(p, q)$_{paired}$, can be denoted as:

$$DT(p,q)_{paired}=\{DT(q,p),DT(p,q)\}$$

In other words, in one embodiment, the final output of the computer vision system 101's polygon similarity evaluation is the paired distance transform DT(p, q)$_{paired}$ that is given by the pair of numbers (distance transform metric of p with respect to q, distance transform metric of q with respect to p). With respect to the example of FIGS. 4A-4B and 5A-5B, the paired asymmetric output DT(p, q)$_{paired}$ is as follows:

$$DT(p,q)_{paired}=\{DT(q,p),DT(p,q)\}=\{0.417,0.567\}$$

Alternatively, to generate a symmetric polygon similarity evaluation as a final output for this example, the computer vision system 101 can average the two values. Therefore, DT(p, q)$_{Symmetric}$ or the example of FIGS. 4A-4B and 5A-5B can be determined as follows:

$$DT(p,q)_{symmetric}=\text{Average}(DT(p,q),DT(q,p))=\text{Average}(0.417,0.567)=0.492$$

As previously discussed, this computed polygon similarity metric (asymmetric or symmetric) can be applied in any type of object detection use case. For example, in step 209, the computer vision system 101 optionally confirms a detection of an object of interest in an image on the polygon similarity of the first polygon p with respect to the second polygon q, the polygon similarity of the second polygon q with respect to the first polygon p, the asymmetric polygon similarity (e.g., DT(p, q)$_{paired}$), a symmetric polygon similarity generated from asymmetric pair, or a combination thereof. For example, the computer vision system 101 can specify a maximum threshold (e.g., maximum distance) between two polygons to classify the two polygons as similar. If the polygon similarity metric determined according to the various embodiments described herein is below the threshold the two polygons can be designated as being similar, with metric values above the threshold being designated as not similar. In other embodiments, if an object is being compared to two or more possible matches, the polygon similarity metrics can be computed for each possible match with the final match having a minimum metric value.

In the examples of FIGS. 4A-4B and 5A-5B, the distance transformations 401 and 501 are represented as numerical values overlaid on the spatial arrangement of the image elements or pixels of the original input image. This representation of a distance transform is provided by way of illustration and not as a limitation. It is contemplated that any type representation of distance transformations can be used. For example, FIG. 6 is a diagram illustrating an example of using a visual representation to depict a distance transformation for evaluating polygon similarity, according to one embodiment. As shown, the image 601 depicts a visual representation of a polygon boundary 603 corresponding to the contours of an object detected in an original input image. Image 605 is a distance transformation of the image 601 based on the polygon boundary 603. In this example, instead of using number values to indicate distance, black pixels correspond to low values and white pixels correspond to large values of distance. Image 607 depicts a version of image 605 on which a polygon boundary 609 is overlaid for evaluating polygon similarity. In yet other embodiment, non-visual representations of the distance transform can be used. For example, a data structure can be created to represent a spatial index of the image elements or pixels and their respective distance values determined from a distance transform.

Figure 7A:
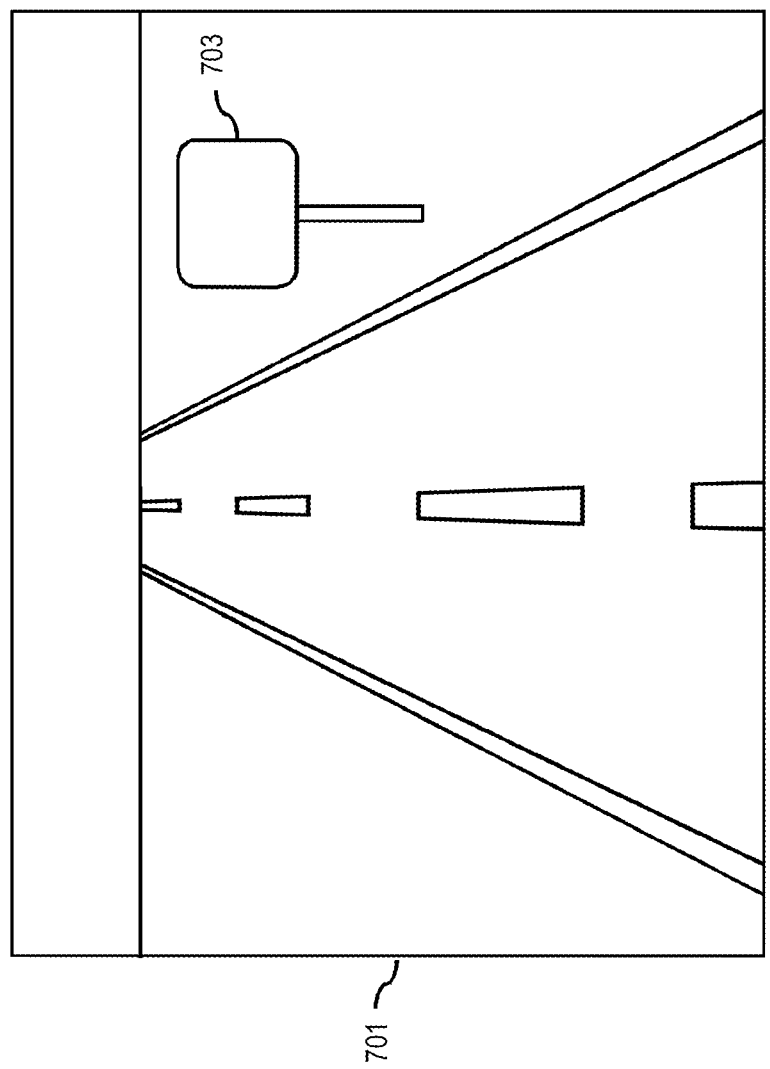
FIGS. 7A and 7B are diagrams illustrating an example use case of a polygon similarity evaluation for vehicle localization using visual odometry, according to one embodiment.
Figure 7B:
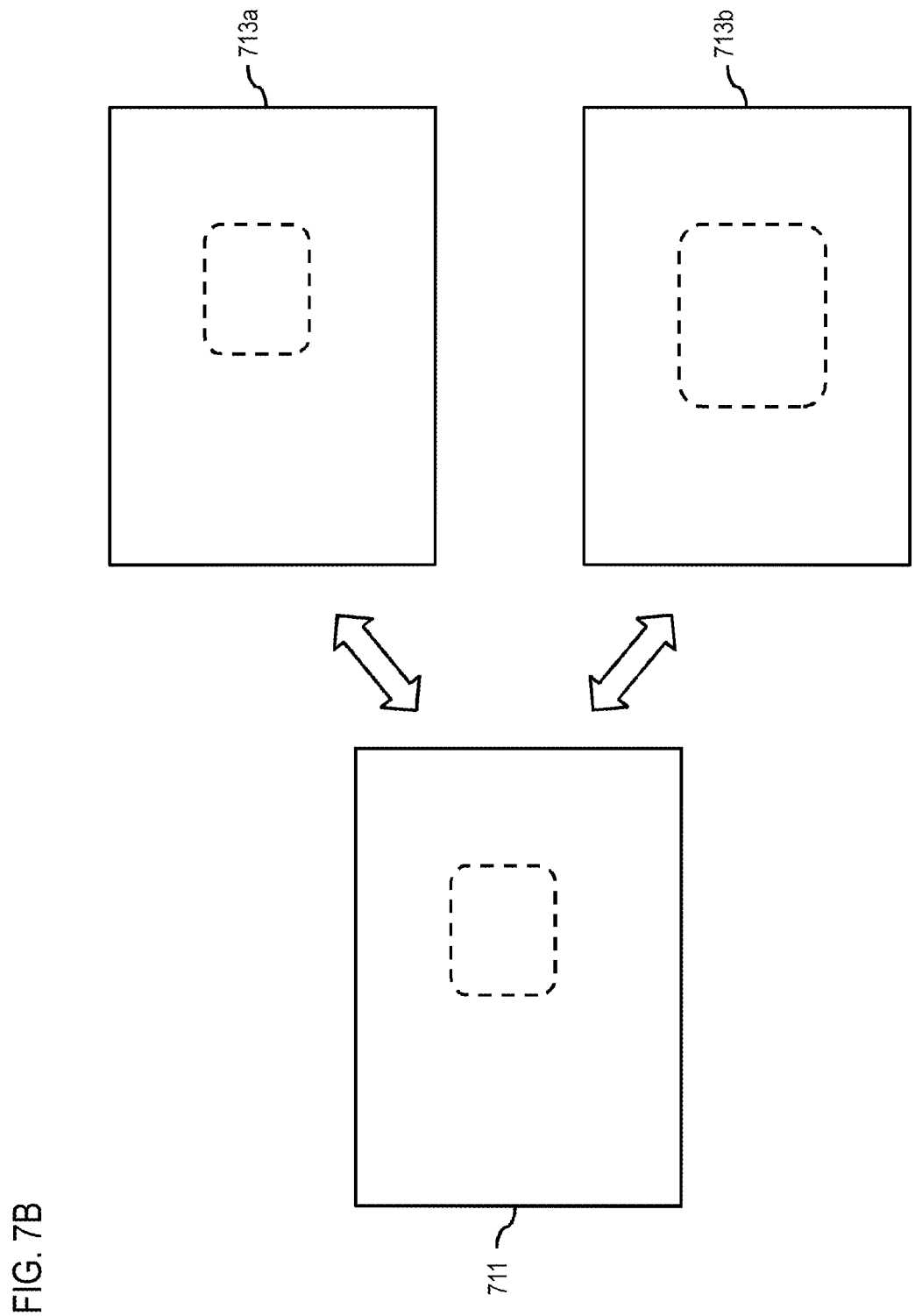

As previously discussed, the embodiments of evaluating polygon similarity described herein can be used for any number of object detection use cases. FIGS. 7A and 7B are diagrams illustrating an example use case of a polygon similarity evaluation for vehicle localization using visual odometry, according to one embodiment. Understanding a vehicle's location on a map enables planning of a route, both on fine and coarse scales. Such an understanding is particularly important for autonomous driving where high accuracy and real-time localization of vehicles (e.g., a vehicle 103c) are needed. Generally, for autonomous driving and other similar use cases, a localization accuracy of around 10 cm is needed for safe driving. One way to achieve this level of accuracy is to use visual odometry, in which features or object are detected from imagery. These features can then be matched to a database of features to determine the vehicle's position location. In one embodiment, this matching can be performed by comparing the detected object against reference or ground-truth objects with known camera poses (e.g., a location, angle, tilt, orientation, etc. of a camera mounted on the vehicle 103c that is capturing images to process for visual odometry).

As shown, FIG. 7A illustrates an image 701 captured by a camera of a vehicle 103c traveling on a roadway. The computer vision system 101 detects an object of interest (e.g., a road sign 703) in the image whose location is known (e.g., location stored in geographic database 115) and that can be used for visual odometry. The computer vision system 101 recognizes the road sign 703 and creates a polygonal representation 711 of the road sign 703 as shown in FIG. 7B. The computer vision system 101 can then retrieve ground truth representations 713a and 713b that depict the known road sign 703 from different known camera poses. For example, ground truth representation 713a includes a polygon representing the road sign 703 as its edges would appear from a first known distance and camera pose, and ground truth representation 713b includes a polygon representing the road sign 703 as its edges would appear from a second known distance and camera pose. The computer vision system 100 then evaluates the polygon similarity between the detected polygon 711 against each of the ground truth polygons 713a and 713b according to the embodiments of the asymmetric distance transformation metric described herein. The distance and camera pose of the ground truth polygon 713a or 713b with the lowest computed distance transformation metric can then be selected as the camera pose of the detected polygon 711 and corresponding road sign 703. The greater edge sensitivity of the embodiments of the polygon similarity metric described herein enables the computer vision system 101 to more precisely detect slight edge differences (e.g., down to the pixel level), thereby advantageously increasing the precision of the resulting localization of the vehicle 103c.

Returning to FIG. 1, as shown, the system 100 includes the computer vision system 101 configured to detect objects as polygon and to evaluate the similarity of the polygons using the asymmetric distance transform metric described according to the various embodiments described herein. In one embodiment, the computer vision system 101 includes or is otherwise associated with one or more machine learning networks for object detection from image data (e.g., the CNN 107 for generating object feature maps from input images, and the RNN 105 for traversing the feature map to iteratively and directly output coordinates of the contours of the objects as polygon or polygon vertices). In one embodiment, the computer vision system 101 includes sensors (e.g., camera sensors) and related components for automatically detecting objects of interest in image data. The computer vision system 101 can be a standalone component or can be incorporated into any of the surveillance device 103a, IoT device 103b, vehicle 103c, and/or any other device capable of visual object detection.

In one embodiment, at least one machine learning network of the computer vision system 101 is a traditional convolutional neural network (e.g., the CNN 107) which consists of multiple layers of collections of one or more neurons (e.g., processing nodes of the neural network) which are configured to process a portion of an input image. In one embodiment, the receptive fields of these collections of neurons (e.g., a receptive layer) can be configured to correspond to the area of an input image delineated by a respective a grid cell generated as described above. In addition, the computer vision system 101 can also include a recurrent neural network in which connections between nodes or neurons of the network form a directed cycle to enable dynamic temporal behavior. In contrast to convolutional neural networks, recurrent neural networks have internal memories that can store sequential information or inputs to generate output features. It is contemplated that any type of recurrent neural network can be used with the embodiments described herein including, but not limited to: (1) recursive neural networks including tensor-based recursive neural networks that enable traversing of graph-like structures in topological order; (2) a fully recurrent network comprising neurons or nodes with a directed connection to each other neuron or node; etc.

In one embodiment, the computer vision system 101 also has connectivity or access to a polygon database 109 for storing or retrieving polygonal representations of objects of interest. By way of example, each polygon representation can be stored in the polygon database 109 a data record or structure comprising a list of (x, y) coordinates indicate the vertices of the polygon. In one embodiment, the computer vision system 101 also has connectivity the geographic database 115 which stores representations of mapped geographic features to facilitate visual odometry to increase localization accuracy. The geographic database 115 can also store polygonal representations of ground truth or reference objects (e.g., signs, road markings, lane lines, buildings, landmarks, etc.) that can be detected for visual odometry and/or other mapping related functions.

In one embodiment, the computer vision system 101 has connectivity over a communication network 117 to the services platform 111 that provides one or more services 113. By way of example, the services 113 may be third party services and include mapping services, navigation services, travel planning services, notification services, social networking services, content (e.g., audio, video, images, etc.) provisioning services, application services, storage services, contextual information determination services, location based services, information based services (e.g., weather, news, etc.), etc. In one embodiment, the services 113 uses the output of the computer vision system 101 (e.g., polygon similarity evaluations, object detections, lane line coordinates, polylines, lane attribute, lane features, etc.) to localize the vehicle 103c or a user equipment 119 (e.g., a portable navigation device, smartphone, portable computer, tablet, etc.) to provide services 113 such as navigation, mapping, other location-based services, etc.

In one embodiment, the computer vision system 101 may be a platform with multiple interconnected components. The computer vision system 101 may include multiple servers, intelligent networking devices, computing devices, components and corresponding software for asymmetric evaluation of polygon similarity according to the various embodiments described herein. In addition, it is noted that the computer vision system 101 may be a separate entity of the system 100, a part of the one or more services 113, a part of the services platform 111, or included within the surveillance device 103a, IoT device 103b, vehicle 103c, and/or UE 119.

In one embodiment, content providers 121a-121m (collectively referred to as content providers 121) may provide content or data (e.g., including geographic data, parametric representations of mapped features, etc.) to the geographic database 115, the computer vision system 101, the services platform 111, the services 113, the UE 119, the vehicle 103c, and/or an application 123 executing on the UE 119. The content provided may be any type of content, such as polygonal representations of objects (e.g., including ground truth polygons), map content, textual content, audio content, video content, image content, etc. In one embodiment, the content providers 121 may provide content that may aid in the evaluation of polygon similarity according to the various embodiments described herein. In one embodiment, the content providers 121 may also store content associated with the polygon database 109, geographic database 115, computer vision system 101, services platform 111, services 113, UE 119, surveillance device 103a, IoT device 103b, and/or vehicle 103c. In another embodiment, the content providers 121 may manage access to a central repository of data, and offer a consistent, standard interface to data, such as a repository of the geographic database 115.

In one embodiment, the UE 119, surveillance device 103a, IoT device 103b, and/or vehicle 103c may execute the software application 123 to detect objects in images and/or evaluate polygon similarity according the embodiments described herein. By way of example, the application 123 may also be any type of application that is executable on UE 119, surveillance device 103a, IoT device 103b, and/or vehicle 103c, such as device control applications, autonomous driving applications, mapping applications, location-based service applications, navigation applications, content provisioning services, camera/imaging application, media player applications, social networking applications, calendar applications, and the like. In one embodiment, the application 123 may act as a client for the computer vision system 101 and perform one or more functions associated with detecting lane lines using a cursor recurrent neural network alone or in combination with the computer vision system 101.

By way of example, the UE 119, surveillance device 103a, and/or IoT device 103b, is any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UE 119, surveillance device 103a, and/or IoT device 103b can support any type of interface to the user (such as "wearable" circuitry, etc.). In one embodiment, the UE 119 may be associated with or be a component of the surveillance device 103a, IoT device 103b, and/or vehicle 103c.

In one embodiment, the UE 119, surveillance device 103a, IoT device 103b, and/or vehicle 103c are configured with various sensors for generating or collecting environmental image data (e.g., for the computer vision system 101), related geographic data, etc. In one embodiment, the sensed data represent sensor data associated with a geographic location or coordinates at which the sensor data was collected, and polygonal representations of detected objects of interest. By way of example, the sensors may include a global positioning sensor for gathering location data (e.g., GPS), IMUs, a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture road sign information, images of road obstructions, etc. for analysis), an audio recorder for gathering audio data, velocity sensors mounted on steering wheels of the vehicles, switch sensors for determining whether one or more vehicle switches are engaged, and the like.

Other examples of sensors of the UE 119, surveillance device 103a, IoT device 103b, and/or vehicle 103c may include light sensors, orientation sensors augmented with height sensors and acceleration sensor (e.g., an accelerometer can measure acceleration and can be used to determine orientation of the vehicle), tilt sensors to detect the degree of incline or decline (e.g., slope) of the vehicle along a path of travel, moisture sensors, pressure sensors, etc. In a further example embodiment, sensors about the perimeter of the UE 119, surveillance device 103a, IoT device 103b, and/or vehicle 103c may detect the relative distance of the device or vehicle from a lane or roadway, the presence of other vehicles, pedestrians, traffic lights, potholes and any other objects, or a combination thereof. In one scenario, the sensors may detect weather data, traffic information, or a combination thereof. In one embodiment, the UE 119, surveillance device 103a, IoT device 103b, and/or vehicle 103c may include GPS or other satellite-based receivers to obtain geographic coordinates from satellites 123 for determining current location and time. Further, the location can be determined by visual odometry, triangulation systems such as A-GPS, Cell of Origin, or other location extrapolation technologies. In yet another embodiment, the sensors can determine the status of various control elements of the car, such as activation of wipers, use of a brake pedal, use of an acceleration pedal, angle of the steering wheel, activation of hazard lights, activation of head lights, etc.

In one embodiment, the communication network 117 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the computer vision system 101, services platform 111, services 113, UE 119, surveillance device 103a, IoT device 103b, vehicle 103c, and/or content providers 121 communicate with each other and other components of the system 100 using well known, new or still developing protocols. In this context, a protocol includes a set of rules defining how the network nodes within the communication network 117 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 8:
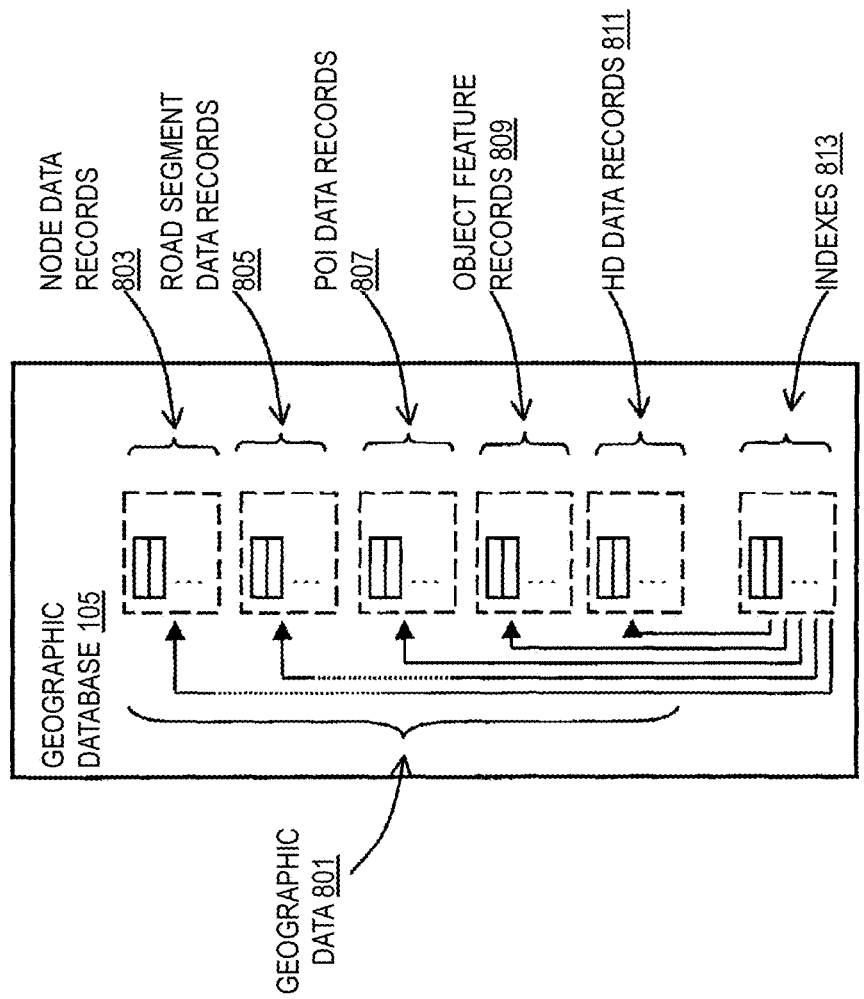
FIG. 8 is a diagram of a geographic database, according to one embodiment.

FIG. 8 is a diagram of a geographic database, according to one embodiment. In one embodiment, the geographic database 115 includes geographic data 801 used for (or configured to be compiled to be used for) mapping and/or navigation-related services, such as for visual odometry based on the evaluation of polygon similarity according to the embodiments described herein. In one embodiment, the geographic database 115 include high definition (HD) mapping data that provide centimeter-level or better accuracy of map features. For example, the geographic database 115 can be based on Light Detection and Ranging (LiDAR) or equivalent technology to collect billions of 3D points and model road surfaces and other map features down to the number lanes and their widths. In one embodiment, the HD mapping data (e.g., HD data records 811) capture and store details such as the slope and curvature of the road, lane markings, roadside objects such as sign posts, including what the signage denotes. By way of example, the HD mapping data enable highly automated vehicles to precisely localize themselves on the road.

In one embodiment, geographic features (e.g., two-dimensional or three-dimensional features) are represented using polygons (e.g., two-dimensional features) or polygon extrusions (e.g., three-dimensional features). In one embodiment, these polygons can also represent ground truth or reference objects (e.g., signs, road markings, lane lines, landmarks, etc.) used for visual odometry. For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. Accordingly, the terms polygons and polygon extrusions as used herein can be used interchangeably.

In one embodiment, the following terminology applies to the representation of geographic features in the geographic database 115.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 115 follows certain conventions. For example, links do not cross themselves and do not cross each other except at a node. Also, there are no duplicated shape points, nodes, or links. Two links that connect each other have a common node. In the geographic database 115, overlapping geographic features are represented by overlapping polygons. When polygons overlap, the boundary of one polygon crosses the boundary of the other polygon. In the geographic database 115, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 115 includes node data records 803, road segment or link data records 805, POI data records 807, object feature records 809, HD mapping data records 811, and indexes 813, for example. More, fewer or different data records can be provided. In one embodiment, additional data records (not shown) can include cartographic ("carto") data records, routing data, and maneuver data. In one embodiment, the indexes 813 may improve the speed of data retrieval operations in the geographic database 115. In one embodiment, the indexes 813 may be used to quickly locate data without having to search every row in the geographic database 115 every time it is accessed. For example, in one embodiment, the indexes 813 can be a spatial index of the polygon points associated with stored feature polygons.

In exemplary embodiments, the road segment data records 805 are links or segments representing roads, streets, or paths, as can be used in the calculated route or recorded route information for determination of one or more personalized routes. The node data records 803 are end points corresponding to the respective links or segments of the road segment data records 805. The road link data records 805 and the node data records 803 represent a road network, such as used by vehicles, cars, and/or other entities. Alternatively, the geographic database 115 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 115 can include data about the POIs and their respective locations in the POI data records 807. The geographic database 115 can also include data about places, such as cities, towns, or other communities, and other geographic features, such as bodies of water, mountain ranges, etc. Such place or feature data can be part of the POI data records 307 or can be associated with POIs or POI data records 807 (such as a data point used for displaying or representing a position of a city).

In one embodiment, the geographic database 115 can also include object feature records 809 for storing objects of interest (e.g., as polygonal, polyline, and/or parametric representations) that can be used for visual odometry according to the various embodiments described herein. In one embodiment, the geographic database 115 can also store the data related to evaluating polygon similarity and/or historically calculated similarity values. By way of example, the object feature records 809 can be associated with one or more of the node records 803, road segment records 805, and/or POI data records 807 to support localization or visual odometry based on the features stored therein and the corresponding estimated quality of the features. In this way, the object feature records 809 can also be associated with the characteristics or metadata of the corresponding record 803, 805, and/or 807.

In one embodiment, as discussed above, the HD mapping data records 811 model road surfaces and other map features to centimeter-level or better accuracy (e.g., including centimeter-level accuracy for ground truth objects used for visual odometry based on polygon similarity according to the embodiments described herein). The HD mapping data records 811 also include ground truth object models that provide the precise object geometry with polygonal boundaries, as well as rich attributes of the models. These rich attributes include, but are not limited to, object type, object location, lane traversal information, lane types, lane marking types, lane level speed limit information, and/or the like. In one embodiment, the HD mapping data records 811 are divided into spatial partitions of varying sizes to provide HD mapping data to the UE 119, surveillance device 103a, IoT device 103b, vehicles 103c, and/or other end user devices with near real-time speed without overloading the available resources of the devices (e.g., computational, memory, bandwidth, etc. resources).

In one embodiment, the HD mapping data records 811 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the HD mapping data records 811.

In one embodiment, the HD mapping data records 811 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like.

In one embodiment, the geographic database 115 can be maintained by the content provider 121 in association with the services platform 111 (e.g., a map developer). The map developer can collect geographic data to generate and enhance the geographic database 115. There can be different ways used by the map developer to collect data. These ways can include obtaining data from other sources, such as municipalities or respective geographic authorities. In addition, the map developer can employ field personnel to travel by vehicle (e.g., vehicle 103c and/or UE 119) along roads throughout the geographic region to observe features and/or record information about them, for example. Also, remote sensing, such as aerial or satellite photography, can be used.

The geographic database 115 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 103c or UE 119, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for providing an asymmetric evaluation of polygon similarity may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 9:
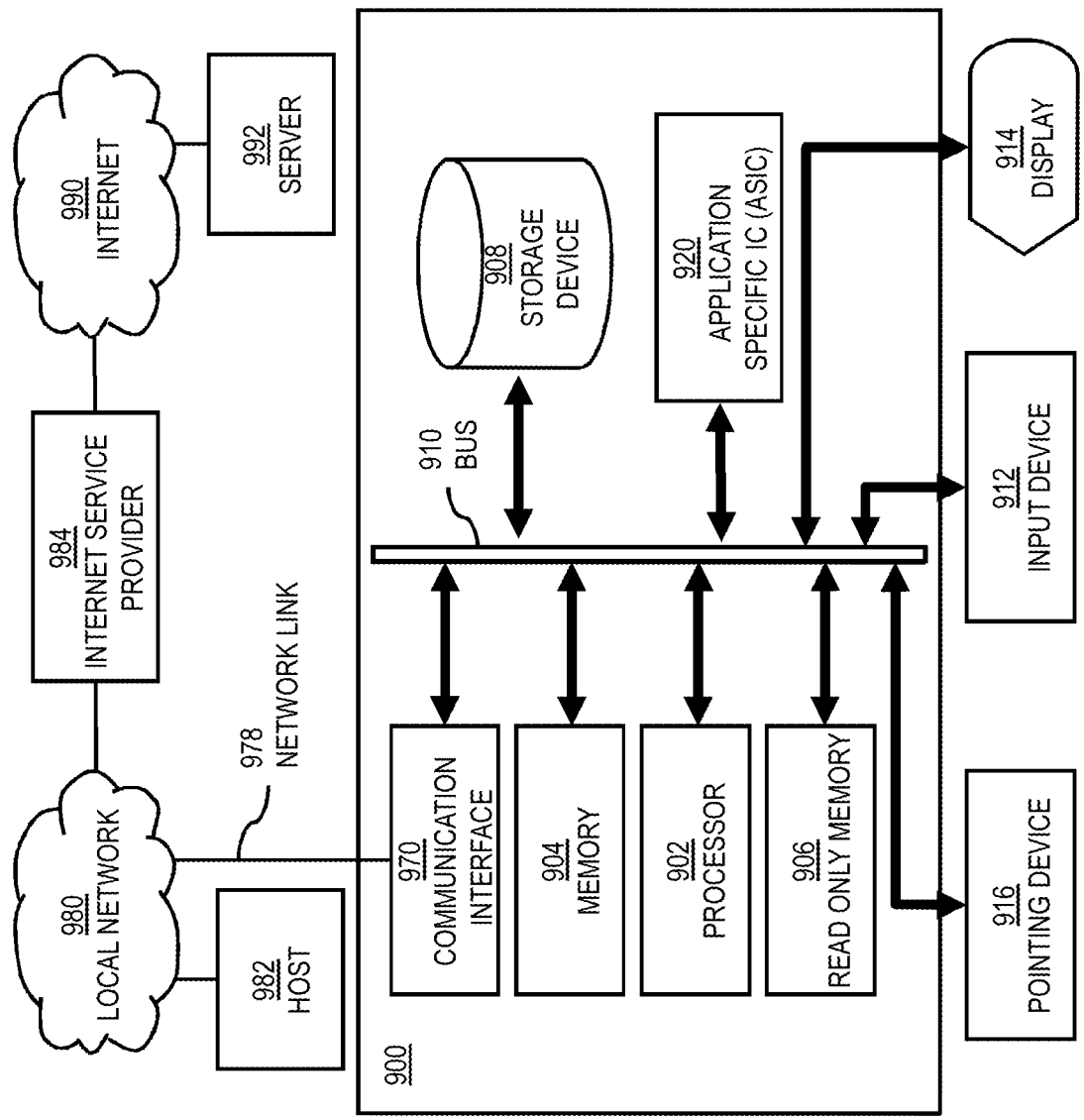
FIG. 9 is a diagram of hardware that can be used to implement an embodiment of the invention.

FIG. 9 illustrates a computer system 900 upon which an embodiment of the invention may be implemented. Computer system 900 is programmed (e.g., via computer program code or instructions) to provide an asymmetric evaluation of polygon similarity as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 910 includes one or more parallel conductors of information so that information is transferred quickly among devices coupled to the bus 910. One or more processors 902 for processing information are coupled with the bus 910.

A processor 902 performs a set of operations on information as specified by computer program code related to providing an asymmetric evaluation of polygon similarity. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or other dynamic storage device, stores information including processor instructions for providing an asymmetric evaluation of polygon similarity. Dynamic memory allows information stored therein to be changed by the computer system 900. RANI allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for providing an asymmetric evaluation of polygon similarity, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT) or a liquid crystal display (LCD), or plasma screen or printer for presenting text or images, and a pointing device 916, such as a mouse or a trackball or cursor direction keys, or motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of application specific ICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 117 for providing an asymmetric evaluation of polygon similarity.

The term computer-readable medium is used herein to refer to any medium that participates in providing information to processor 902, including instructions for execution. Such a medium may take many forms, including, but not limited to, non-volatile media, volatile media and transmission media. Non-volatile media include, for example, optical or magnetic disks, such as storage device 908. Volatile media include, for example, dynamic memory 904. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 10 illustrates a chip set 1000 upon which an embodiment of the invention may be implemented. Chip set 1000 is programmed to provide an asymmetric evaluation of polygon similarity as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to provide an asymmetric evaluation of polygon similarity. The memory 1005 also stores the data associated with or generated by the execution of the inventive steps.

Figure 11:
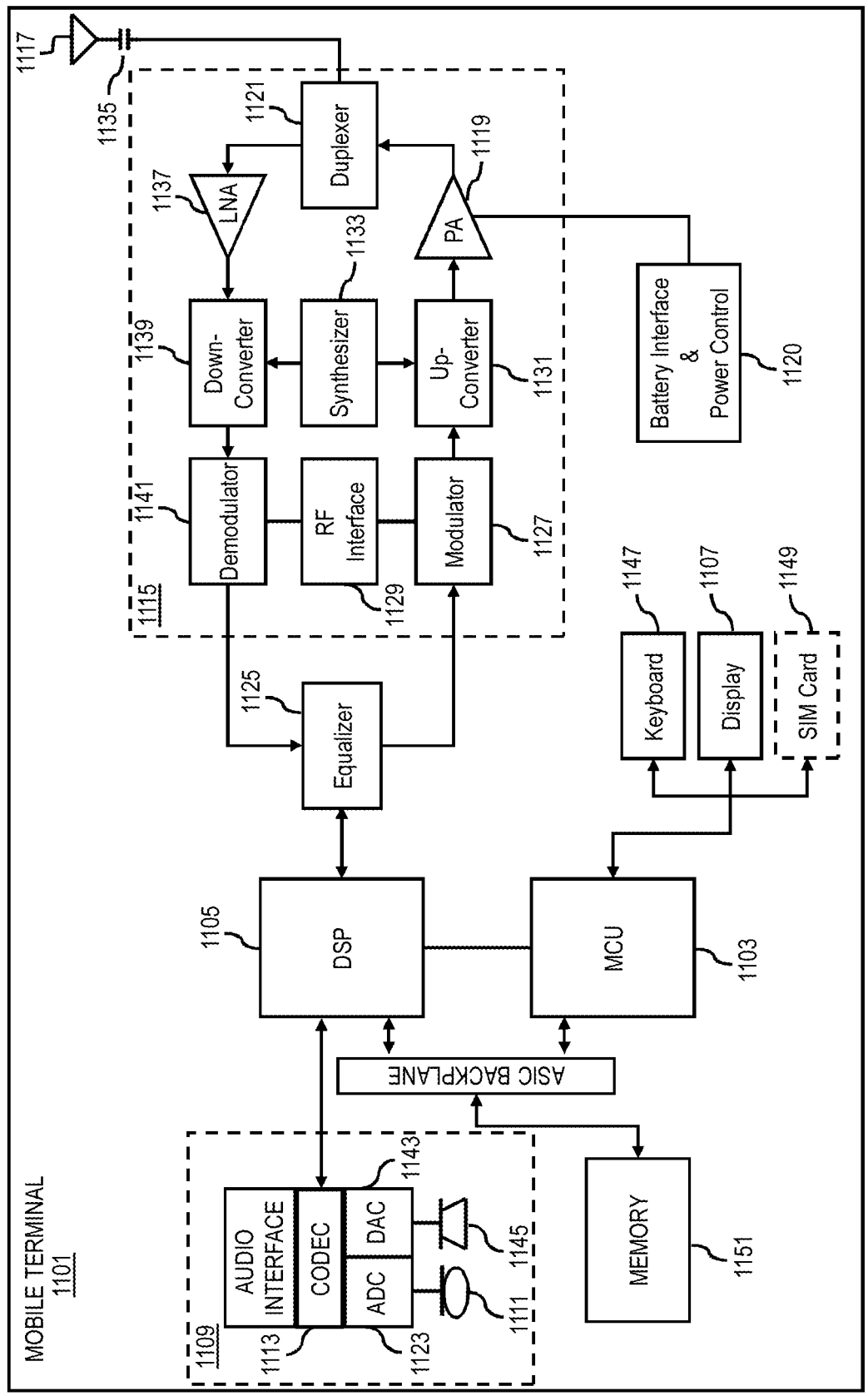
FIG. 11 is a diagram of a mobile terminal (e.g., handset) that can be used to implement an embodiment of the invention.

FIG. 11 is a diagram of exemplary components of a mobile station (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile station functions that offer automatic contact matching. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile station 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103—which can be implemented as a Central Processing Unit (CPU) (not shown).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile station 1101 to provide an asymmetric evaluation of polygon similarity. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the station. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile station 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1151 may be, but not limited to, a single memory, CD, DVD, ROM, RAM, EEPROM, optical storage, or any other non-volatile or non-transitory storage medium capable of storing digital data.

An optionally incorporated SIM card 1149 carries, for instance, important information, such as the cellular phone number, the carrier supplying service, subscription details, and security information. The SIM card 1149 serves primarily to identify the mobile station 1101 on a radio network. The card 1149 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer-implemented method for evaluating polygon similarity using a computer vision system comprising:
    receiving a first polygon representing an object depicted in an image, wherein the first polygon is determined from the image by the computer vision system;
    generating, using the image, a transformation image having a plurality of image elements whose values are based on a respective distance between each of the plurality of image elements and a nearest image element that is located on a first boundary of the first polygon;
    determining a subset of the plurality of image elements of the transformation image that intersects with a second boundary of a second polygon, wherein the second polygon is recognized by the computer vision system in the image or in another image, or is constructed as a representation of the object, or a combination thereof; and
    calculating a polygon similarity of the second polygon with respect to the first polygon based on the values of the subset of the plurality of image elements of the transformation image normalized to a length of the second boundary of the second polygon.

2. The method of claim 1, further comprising:
    calculating a polygon similarity of the first polygon with respect to the second polygon by substituting the first polygon for the second polygon and vice versa; and
    outputting an asymmetric polygon similarity for the first polygon and the second polygon as a pair comprising the polygon similarity of the first polygon with respect to the second polygon and the polygon similarity of the second polygon with respect to the first polygon.

3. The method of claim 2, further comprising:
    confirming a detection of the object in the image by the computer vision system based on the polygon similarity of the first polygon with respect to the second polygon, the polygon similarity of the second polygon with respect to the first polygon, the asymmetric polygon similarity, a symmetric polygon similarity determined from the asymmetric polygon similarity, or a combination thereof.

4. The method of claim 1, further comprising:
determining a distance metric for determining the respective distance based on a specified use of the computer vision system.

5. The method of claim 4, wherein the distance metric includes a Euclidean distance, a city-block distance, or a combination thereof.

6. The method of claim 1, wherein the first polygon, the second polygon, or a combination thereof is represented as a list of polygon vertices, the method further comprising:
constructing the first boundary of the first polygon, the second boundary of the second polygon, or a combination thereof from the list of polygon vertices.

7. The method of claim 1, wherein the object is an edge-based object, and wherein the first boundary of the first polygon is a representation of the edge-based object.

8. The method of claim 1, wherein the transformation image is generated by dividing the image into the plurality of image elements of an identical size defined by one length unit, and assigning the image elements with the values in the length unit in proportion to the respective distance, and
wherein the length of the second boundary is quantified based on the length unit.

9. The method of claim 1, wherein said each of the plurality of image elements represents a pixel or a group of pixels of the image, the transformation image, or a combination thereof.

10. The method of claim 1, further comprising:
identifying the object based, at least in part, on the polygon similarity, wherein the second polygon is constructed as a reference representation of the object, and
wherein the image and the transformation image have a same image size.

11. An apparatus for evaluating polygon similarity using a computer vision system comprising:
at least one processor; and
at least one memory including computer program code for one or more programs,
the at least one memory and the computer program code within the at least one processor, cause the apparatus to perform at least the following,
receive a first polygon representing an object depicted in an image, wherein the first polygon is determined from the image by the computer vision system;
generate, using the image, a transformation image having a plurality of image elements whose values are based on a respective distance between each of the plurality of image elements and a nearest image element that is located on a first boundary of the first polygon;
determine a subset of the plurality of image elements of the transformation image that intersects with a second boundary of a second polygon, wherein the second polygon is recognized by the computer vision system in the image or in another image, or is constructed as a representation of the object, or a combination thereof; and
calculate a polygon similarity of the second polygon with respect to the first polygon based on the values of the subset of the plurality of image elements of the transformation image normalized to a length of the second boundary of the second polygon.

12. The apparatus of claim 11, wherein the apparatus is further caused to:
calculate a polygon similarity of the second polygon with respect to the first polygon by substituting the second polygon for the first polygon and vice versa; and
output an asymmetric polygon similarity for the first polygon and the second polygon as a pair comprising the polygon similarity of the first polygon with respect to the second polygon and the polygon similarity of the second polygon with respect to the first polygon.

13. The apparatus of claim 12, wherein the apparatus is further caused to:
confirm a detection of the object in the image by the computer vision system based on the polygon similarity of the first polygon with respect to the second polygon, the polygon similarity of the second polygon with respect to the first polygon, the asymmetric polygon similarity, a symmetric polygon similarity determined from the asymmetric polygon similarity, or a combination thereof.

14. The apparatus of claim 11, wherein the apparatus is further caused to:
determine a distance metric for determining the respective distance based on a specified use of the computer vision system.

15. The apparatus of claim 14, wherein the distance metric includes a Euclidean distance, a city-block distance, or a combination thereof.

16. A non-transitory computer-readable storage medium for evaluating polygon similarity using a computer vision system, carrying one or more sequences of one or more instructions which, when executed by one or more processors, cause an apparatus to perform:
receiving a first polygon representing an object depicted in an image, wherein the first polygon is determined from the image by the computer vision system;
generating, using the image, a transformation image having a plurality of image elements whose values are based on a respective distance between each of the plurality of image elements and a nearest image element that is located on a first boundary of the first polygon;
determining a subset of the plurality of image elements of the transformation image that intersects with a second boundary of a second polygon, wherein the second polygon is recognized by the computer vision system in the image or in another image, or is constructed as a representation of the object, or a combination thereof; and
calculating a polygon similarity of the second polygon with respect to the first polygon based on the values of the subset of the plurality of image elements of the transformation image normalized to a length of the second boundary of the second polygon.

17. The non-transitory computer-readable storage medium of claim 16, wherein the apparatus is further caused to perform:
calculating a polygon similarity of the first polygon with respect to the second polygon by substituting the first polygon for the second polygon and vice versa; and
outputting an asymmetric polygon similarity for the first polygon and the second polygon as a pair comprising the polygon similarity of the first polygon with respect to the second polygon and the polygon similarity of the second polygon with respect to the first polygon.

18. The non-transitory computer-readable storage medium of claim 17, wherein the apparatus is further caused to perform:
- confirming a detection of the object in the image by the computer vision system based on the polygon similarity of the first polygon with respect to the second polygon, the polygon similarity of the second polygon with respect to the first polygon, the asymmetric polygon similarity, a symmetric polygon similarity determined from the asymmetric polygon similarity, or a combination thereof.

19. The non-transitory computer-readable storage medium of claim 16, wherein the apparatus is further caused to perform:
- determining a distance metric for determining the respective distance based on a specified use of the computer vision system.

20. The non-transitory computer-readable storage medium of claim 19, wherein the distance metric includes a Euclidean distance, a city-block distance, or a combination thereof.

* * * * *